United States Patent
Peggau et al.

(10) Patent No.: US 11,377,611 B2
(45) Date of Patent: Jul. 5, 2022

(54) ORGANOMODIFIED POLYSILOXANES AND THEIR USE FOR DEFOAMING FUELS

(71) Applicant: Evonik Operations GmbH, Essen (DE)

(72) Inventors: Jörg Peggau, Essen (DE); Frauke Henning, Essen (DE); Andrea Lohse, Bottrop (DE)

(73) Assignee: Evonik Operations GmbH, Essen (DE)

( * ) Notice: Subject to any disclaimer, the term of this patent is extended or adjusted under 35 U.S.C. 154(b) by 0 days.

(21) Appl. No.: 17/421,158

(22) PCT Filed: Jan. 7, 2020

(86) PCT No.: PCT/EP2020/050179
§ 371 (c)(1),
(2) Date: Jul. 7, 2021

(87) PCT Pub. No.: WO2020/144162
PCT Pub. Date: Jul. 16, 2020

(65) Prior Publication Data
US 2022/0041945 A1  Feb. 10, 2022

(30) Foreign Application Priority Data
Jan. 10, 2019  (EP) .................................... 19151100

(51) Int. Cl.
| | | |
|---|---|---|
| *C10L 1/28* | (2006.01) | |
| *C08G 77/46* | (2006.01) | |
| *C08L 83/12* | (2006.01) | |
| *C08G 77/00* | (2006.01) | |

(52) U.S. Cl.
CPC .............. *C10L 1/285* (2013.01); *C08G 77/46* (2013.01); *C08L 83/12* (2013.01); *C08G 77/80* (2013.01); *C10L 2200/0446* (2013.01); *C10L 2200/0476* (2013.01); *C10L 2230/082* (2013.01); *C10L 2230/086* (2013.01)

(58) Field of Classification Search
CPC .............. C10L 1/285; C10L 2230/086; C10L 2200/0446; C10L 2200/0476; C10L 2230/082; C08G 77/46; C08G 77/80
See application file for complete search history.

(56) References Cited

U.S. PATENT DOCUMENTS

| | | | | |
|---|---|---|---|---|
| 5,542,960 A | * | 8/1996 | Grabowski | ............ C08G 77/46 44/320 |
| 5,613,988 A | | 3/1997 | Spiegler et al. | |
| 2008/0196586 A1 | * | 8/2008 | Karl | .......................... C10L 1/14 95/154 |
| 2009/0007483 A1 | | 1/2009 | Hansel et al. | |

FOREIGN PATENT DOCUMENTS

| | | |
|---|---|---|
| DE | 103 14 853 | 10/2004 |
| DE | 10 2004 018 926 | 11/2005 |
| DE | 10 2005 006 962 | 8/2006 |
| DE | 10 2007 031 287 | 1/2009 |
| EP | 0 741 182 | 7/2001 |
| EP | 0 849 352 | 3/2003 |
| GB | 2 173 510 | 10/1986 |
| GB | 2 248 068 | 3/1992 |

OTHER PUBLICATIONS

US 5,334,227 A, 08/1994, Grabowski (withdrawn)
Extended European Search Report dated Jun. 26, 2019 in European Application No. 19151100.5.
International Search Report dated Mar. 25, 2020 in PCT/EP2020/050179 with English translation, 5 pages.
Written Opinion dated Mar. 25, 2020 in PCT/EP2020/050179 with English translation, 8 pages.
U.S. Appl. No. 12/165,735, filed Jul. 1, 2008, 2009/0007483, Hansel et al.
William C. Griffin, "Classification of Surface-Active Agents by "HLB"," Journal of the Society of Cosmetic Chemists, 311-326, 1949.

* cited by examiner

*Primary Examiner* — Cephia D Toomer
(74) *Attorney, Agent, or Firm* — Grüneberg and Myers PLLC

(57) ABSTRACT

Disclosed are organomodified polysiloxanes, compositions, in particular fuel compositions, that include these organomodified polysiloxanes, and the use of the organomodified polysiloxanes for the defoaming of fuels.

31 Claims, No Drawings

ORGANOMODIFIED POLYSILOXANES AND THEIR USE FOR DEFOAMING FUELS

CROSS-REFERENCE TO RELATED APPLICATIONS

This application is a National Stage entry under § 371 of International Application No. PCT/EP2020/050179, filed on Jan. 7, 2020, and which claims the benefit of European Application No, 19151100.5, filed on Jan. 10, 2019. The content of each of these applications is hereby incorporated by reference in its entirety.

BACKGROUND OF THE INVENTION

Field of the Invention

The invention relates to organomodified polysiloxanes, compositions, in particular fuel compositions, that comprise these organomodified polysiloxanes, and the use of the organomodified polysiloxanes for the defoaming of fuels.

Description of Related Art

Diesel fuels comprise hydrocarbon mixtures of alkanes, cycloalkanes and aromatics. The predominant portion of these hydrocarbon mixtures is obtained by petroleum fractionation and desulfurized. The hydrocarbon mixtures used for diesel fuels are by way of example kerosene and gas oil. Besides petroleum-based hydrocarbon mixtures, diesel fuels can additionally also comprise fuels that are not based on petroleum, such as for example biofuels (biodiesel).

Diesel fuels have the unpleasant property of evolving foam in conjunction with air when being filled into reservoir vessels such as storage tanks and fuel containers of motor vehicles. This leads to a delay in the filling procedure and to insufficient filling of the storage tanks and fuel containers. For that reason, it is customary to add defoamers to the diesel fuel. These defoamers are intended to be effective at minimal concentration and must not form any damaging residues or negatively impact the combustion of the fuel when the diesel fuel is combusted in the engine. The addition of biofuels generally results in moisture being absorbed to an increased degree, with the result that small amounts of water are present in finely dispersed form in the diesel fuel. The associated stabilization of the foam and retardation of foam disintegration are undesirable. Defoamers that have been developed for diesel fuels having little or no biofuel content often display reduced efficacy when used in diesel fuels having a high biofuel content. Efforts to increase the proportion of renewable raw materials in diesel fuels likewise lead to increased demands on the efficacy of the defoamers. As a result of the increasing demands on minimization of emissions of new engine parts and as a result of the addition of non-petroleum-based fuels, the challenges for defoamers of diesel fuels have risen greatly. This is compounded by the fact that the diversity of raw material sources for the diesel fuel and the possible temperature differences when using the diesel fuel require a high flexibility of the defoamer.

Defoamers based on silicone-polyether copolymers, which are also called polyethersiloxanes, organofunctionally modified polysiloxanes or organomodified polysiloxanes, are known from the prior art and have been variously described in the patent literature.

Without being bound by a theory, it is assumed that the silicone-polyether copolymers described there function as defoamers because they are only very poorly soluble in the diesel fuel and, on account of their surface-active properties, can accumulate and spread on the foam lamella. The destabilization of the foam lamella, which generally occurs in a few seconds, and the associated defoaming, is a consequence of the spreading of the defoamer droplet. The induced flow of the liquid in the foam lamella leads to thinning and ultimately to destruction of the foam lamella. The siloxane chain present in the silicone-polyether copolymer provides the necessary low surface tension; the polyether radicals, bonded pendently and/or terminally to the siloxane chain, improve the compatibility with the diesel fuel. The polyether radicals are usually derived from unsaturated polyethers which are obtained by addition of alkylene oxides, for example ethylene oxide, propylene oxide, butylene oxide, styrene oxide, onto unsaturated starter alcohols, for example alkyl alcohol.

GB 2173510 (A) relates to a method for defoaming diesel fuel or jet fuel, where a defoamer based on a silicone-polyether copolymer of the general formula

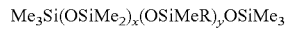

is added to the fuel. This silicone-polyether copolymer contains one or more polyether radicals R that are described by the general formula $Q(A)_nOZ$. Here, Q represents a difunctional group which is bonded to an Si atom, A is an oxyalkylene group, where at least 80% of the oxyalkylene groups are oxyethylene groups, and Z is a hydrogen atom or OCR", where R" is a monovalent group.

One disadvantage with the defoamer described in GB 2173510 (A) is the poor defoaming of moist diesel fuel. The water present in the fuel is either water of condensation, which gets into the fuel during storage in the storage tanks, or is introduced info the fuel during transport in oil tankers—by the tanks being incompletely emptied—and remains there in extremely finely dispersed form.

Improved defoaming of moist diesel fuel is described in EP 0849352 A1. According to this document, the defoaming of moist diesel is intended to be significantly improved over the defoamers typically employed, by more than 65% of the silicone-polyether copolymers used as defoamer including an aromatic-system-containing polyether.

The silicone-polyether copolymers disclosed in EP 0849352 A1 are organomodified polysiloxanes of the general formula

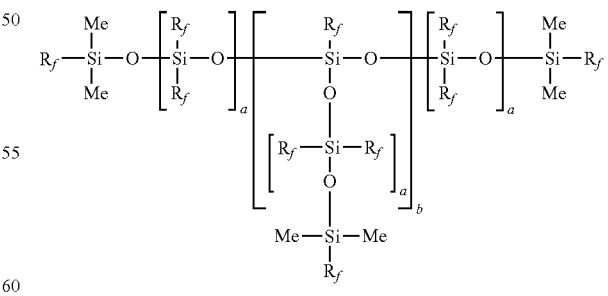

where the radical $R_f$ may be the radical $R^1$, where $R^1$ is an alkyl radical having 1 to 4 carbon atoms or the aryl radical, but at least 80% of the radicals $R_f$ are methyl radicals, or is the radical $R^2$ or $R^3$, with the proviso that at least one radical $R_f$ is the radical $R^2$, where $R^2$ is a polyether radical of the formula II

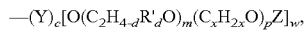

with the definitions
c=0 or 1,
d=1 to 3,
m≥1,
x=2 to 4,
p≥1,
w=1 to 4,
sum of m+p=3 to 100,
R'=a hydrogen radical, a monovalent hydrocarbon radical which has 1 to 18 carbon atoms and may also be aromatic and optionally also a substituted aromatic, the substituents of which are selected from the groups of hydrogen radical, alkyl radical having 1 to 8 carbon atoms, alkoxy radical and hydroxy radical, where the radicals R' may be different, yet for each copolymer molecule at least one radical R' denotes an optionally substituted aromatic,
Z=a hydrogen radical or a monovalent organic radical,
Y=a (w+1)-valent hydrocarbon radical which has 1 to 18 carbon atoms and may also be branched,
$R^3$ is a polyether radical of the formula III

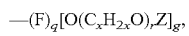

with the definitions
g=1 to 4,
q=0 or 1,
x=2 to 4,
r≥3,
F=a(g+1)-valent hydrocarbon radical which has 1 to 18 carbon atoms and may also be branched,
and where
b is a number from 0 to 8,
a is a number from 1 to 100 when b is a number from 6 to 8;
a is a number from 1 to 200 when b is a number from 3 to 6;
a is a number from 1 to 300 when b is a number from 0 to 3.

The organomodified polysiloxanes disclosed in EP 0849352 A1 must however be used at relatively high concentrations in order to display a good defoaming action. Aside from the larger amount required, this additionally has the drawback of a greater release of $SiO_2$ during the combustion of the fuel. Moreover, it has been found that the cold stability of these organomodified polysiloxanes is frequently not high enough, in addition, the organomodified polysiloxanes of EP 0 849 352 A1 have been described merely for use in sulfur-containing diesel fuels without bio-based content. In modern diesel fuels, the organomodified polysiloxanes of EP 0 849 352 A1 are more readily dissolved by way of the higher polarity and the increased water content of the diesel fuel and tend to emulsify the water in the diesel fuel and to no longer sufficiently defoam the diesel fuel.

DE 10 2007 031 287 A1 describes organomodified polysiloxanes that are improved compared to EP 0849352 A1. These organomodified polysiloxanes are especially suitable tor the defoaming of liquid diesel fuels having biofuel additions. The organomodified polysiloxanes described in DE 10 2007 031 287 A1 are polysiloxanes of the general formula

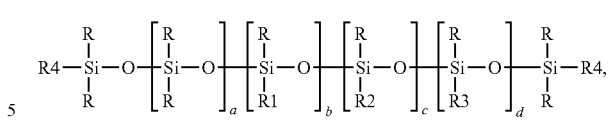

where
N a+b+c+d+2=60.5 to 1000,
a is 50 to 960,
b is 4 to 85,
c is 0.5 to 85,
d is 4 to 85,
the radicals R are independently identical or different aliphatic or aromatic hydrocarbon radicals having 1 to 10 carbon atoms,
the radicals R1 are independently identical or different polyether radicals of the general formula

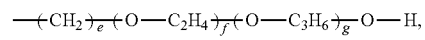

with the proviso that both a statistical and a blockwise arrangement of the oxyalkylene units is possible,
where
e is 3 to 11,
f is 0 to 60,
g is 0 to 60,
the radicals R2 are independently identical or different butylene oxide-containing polyether radicals of the general formula

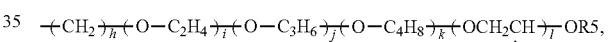

with the proviso that both a statistical and a blockwise arrangement of the oxyalkylene units and any styrene oxide units present is possible,
where
h is 3 to 11,
i is 0 to 60,
j is 0 to 65,
k is 1 to 60,
l is 0 to 60,
the radicals R5 independently are identical or different and denote methyl, acetyl or hydrogen radicals,
the radicals R3 are independently identical or different phenol derivatives of the general formula

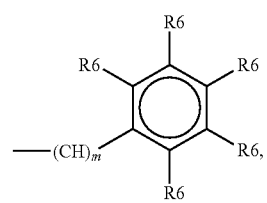

the radicals R6 are independently identical or different radicals from the group of alkyl, hydrogen, hydroxy or alkoxy, with the proviso that at least one radical R6 is a hydroxy group, wherein the index m is an integer of from 3 to 11, and the radicals R4 are independently identical or different radicals R, R1, R2 or R3.

The examples of DE 10 2007 031 287 A1 are based on a hydrosiloxane having an SiH value of 2.6 mmol/g. The quantitative ratio of [R$_2$SiO] to [RHSiO] of the hydrosiloxane is thus smaller than 7:1. This results in a ratio of a/(b+c+d) of smaller than 7:1.

The organomodified polysiloxanes from DE 10 2007 031 287 A1 display high cold stability, but they must be used at relatively high concentrations so that a good defoaming action can be achieved. Aside from a larger amount of organomodified polysiloxanes required, this additionally has the drawback of a greater release of SiO$_2$ during the combustion of the fuel. Moreover, the organomodified polysiloxanes have to bear two different polyether radicals. The synthesis of these organomodified polysiloxanes is therefore comparatively complex. It has further been found that, after processes involving pumped circulation of moist fuel, the water is often not demulsified rapidly enough.

The defoamers are typically incorporated into the fuel in conjunction with additive packages. These additive packages are added to the crude diesel to improve the properties thereof. Additive packages are understood to be mixtures of various additives, for example agents for improving combustion performance, agents for reducing the formation of soot, agents for reducing the formation of harmful exhaust gases, inhibitors for reducing corrosion in the engine and parts thereof, surface-active substances, lubricants and the like. Additive packages of this kind have been described, for example, in GB 2248068 (A) and in the journal Mineralöltechnik, 37(4), p. 20 ff. Here, the additives of the additive package are dissolved in an organic solvent to form a stock concentrate which is added to the crude diesel fuel.

More recently, diesel fuels are being admixed with biofuels. The biofuels that are to be used and their use concentrations are regulated in standard DIN EN 590. This standard is adapted to the constantly changing requirements. For instance, DIN EN 590 was adapted (May 2010 edition) to the requirements of the EC Directive 98/70/EC for satisfying the biofuel quota, according to which an admixture of fatty acid methyl esters (FAME) of up to 7 vol. % is now permitted. The limits for FAME do not apply to other hydrocarbons (not derived from petroleum), such as hydrogenated vegetable oil (HVO), hydrocarbons from GTL (gas-to-liquids) processes or BTL (biomass-to-liquid) processes. On the German market, a plurality of types of mineral-oil-based diesel fuels for automobiles are currently available, which all must satisfy the requirements of DIN EN 590 as per § 4 of the 10$^{th}$ BImSchV [German Federal Immission Control Ordinance]. The trend is to desire an increase in the proportion of biofuel in diesel fuels and a reduction in the proportion of mineral oil. This makes constant further development of the defoamers necessary.

SUMMARY OF THE INVENTION

To that end, the problem addressed by the present invention was that of providing defoamers that overcome at least one disadvantage of the prior art.

The problem addressed was especially that of providing defoamers that have high cold stability and display a high defoaming action even at low use concentrations, with the result that the necessary use amounts can be reduced and hence the release of SiO$_2$ during the combustion of the fuel can be reduced, in addition, the defoamers are to be preferably readily accessible synthetically and preparable from few precursors. In this case, the defoamers are to be suitable for the defoaming of diesel fuels, in particular moist diesel fuels, which besides the fuels based on mineral oil, especially on petroleum, also comprise fuels that are not based on mineral oil, especially not based on petroleum, in particular biofuels (biodiesel).

It has now surprisingly been found that this problem is solved by the provision of defoamers based on organomodified polysiloxanes of general formula (I).

The problem addressed by the present invention is therefore solved by the subject-matter of the embodiments herein. Advantageous configurations of the invention are specified in the embodiments, the examples and the description.

DETAILED DESCRIPTION OF THE INVENTION

The subject-matter of the invention is described by way of example below but without any intention that the invention be restricted to these illustrative embodiments. Where ranges, general formulae or classes of compounds are specified below, these are intended to encompass not only the corresponding ranges or groups of compounds which are explicitly mentioned but also all subranges and subgroups of compounds which can be obtained by extracting individual values (ranges) or compounds. Where documents are cited within the context of the present description, the entire content thereof is intended to be part of the disclosure of the present invention.

Where average values are reported hereinafter, these values are numerical averages unless stated otherwise. Where measurement values, parameters or material properties determined by measurement are reported hereinafter, these are, unless otherwise stated, measurement values, parameters or material properties which are measured at 25° C. and also preferably at a pressure of 101325 Pa (standard pressure) and more preferably additionally at a relative atmospheric humidity of 50%. The number-average molecular weight $M_N$ is determined by means of gel permeation chromatography (GPC) as per standard DIN 55672:2018, preferably as per standard DIN 55872-1:2016.

Where numerical ranges in the form "X to Y" are reported hereinafter, where X and Y represent the limits of the numerical range, this is synonymous with the statement "from at least X up to and including Y", unless otherwise stated. Statements of ranges thus include the range limits X and Y, unless stated otherwise.

Wherever molecules/molecule fragments have one or more stereocentres or can be differentiated into isomers on account of symmetries or can be differentiated info isomers on account of other effects, for example restricted rotation, all possible isomers are included by the present invention.

The formulae (I), (II), (IIa) and (IIb) below describe compounds or radicals that are constructed from repeating units, for example repeating fragments, blocks or monomer units, and can have a molar mass distribution. The frequency of the repeating units is reported by indices. The indices used in the formulae should be regarded as statistical averages (numerical averages). The indices used and also the value ranges of the reported indices are thus understood to be averages of the possible statistical distribution of the structures that are actually present and/or mixtures thereof. The various fragments or repeating units in the formulae (I), (II), (IIa) and (IIb) below may be distributed statistically. Statistical distributions are of blockwise construction with any desired number of blocks and with any desired sequence or are subject to a randomized distribution; they may also have an alternating construction or else form a gradient over the chain, where one is present; in particular they can also form all mixed forms in which groups with different distributions may optionally follow one another. Where, within the context of the present invention, compounds, such as for example organomodified polysiloxanes, are described which can have different units multiple times, then these can occur in these compounds in an unordered manner, for example statistically distributed, or in an ordered manner. The information on the number of units in such compounds is to be understood as an average (numerical average) averaged over all corresponding compounds. Specific embodiments may lead to restrictions of the statistical distributions as a result of the embodiment. There is no change in the statistical distribution for all regions unaffected by the restriction.

The present invention firstly provides an organomodified polysiloxane of general formula (I),

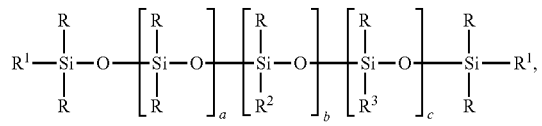

formula (I)

in which
R in each case independently is selected from the group consisting of hydrocarbon radicals, preferably having 1 to 10 carbon atoms, particularly preferably methyl;
$R^1$ in each case independently is selected from the group consisting of R, $R^2$ and $R^3$, preferably R, particularly preferably methyl;
$R^2$ in each case independently is selected from the group consisting of polyether radicals of general formula (II), —$Z^1(OC_2H_4)_d(OC_3H_6)_e(OC_4H_8)_f(OC_2H_3Ph)_gOR^4$     formula (II), preferably of general formula (IIa), —$Z^1(OC_2H_4)_d(OC_3H_6)_eOR^4$     formula (IIa), particularly preferably of general formula (IIb), —$(CH_2)_3(OC_2H_4)_d(OC_3H_6)_eOH$     formula (IIb);

$Z^1$ in each case independently is selected from the group consisting of divalent aliphatic hydrocarbon radicals having 2 to 10, preferably 3 to 4, particularly preferably 3, carbon atoms;
Ph is a phenyl radical;
$R^4$ in each case independently is selected from the group consisting of a hydrogen radical, alkyl radicals having 1 to 4 carbon atoms and acyl radicals having 1 to 4 carbon atoms; preferably is selected from the group consisting of a hydrogen radical, a methyl radical and an acetyl radical; particularly preferably is a hydrogen radical,
$R^3$ in each case independently is selected from the group consisting of radicals of general formula (III),

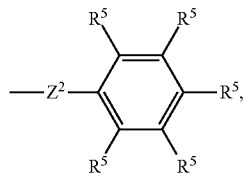

formula (III)

$Z^2$ in each case independently is selected from the group consisting of divalent aliphatic hydrocarbon radicals having 2 to 10, preferably 3 to 4, particularly preferably 3, carbon atoms;
$R^5$ in each case independently is selected from the group consisting of a hydrogen radical, a hydroxy group, alkyl radicals having 1 to 4 carbon atoms and alkoxy radicals having 1 to 4 carbon atoms, with the proviso that at least one radical $R^5$ is a hydroxy group;
where:
a=50 to 960, preferably 80 to 200, particularly preferably 100 to 190;
b=4 to 85, preferably 6 to 25, particularly preferably 8 to 20;
c=0.5 to 10, preferably 0.8 to 8, particularly preferably 1 to less than 4.5;
d=0 to 60, preferably 5 to 20, particularly preferably 10 to 15;
e=0 to 60, preferably 1 to 30, particularly preferably 2 to 5;
f=0 to 60, preferably 0 to 10, particularly preferably 0;
g=0 to 60, preferably 0 to 10, particularly preferably 0;
with the proviso that:
d+e+f+g=1 to 60, preferably 5 to 30, particularly preferably 10 to 20; and
a/(b+c) is greater than 7, preferably >7 to 13, particularly preferably 8 to 12, especially 9 to 11.

The inventive organomodified polysiloxanes of formula (I) may in particular be used as defoamers for fuel compositions that comprise diesel fuel or heating oil and preferably biofuel.

The following preferably applies for the organomodified polysiloxane of formula (I): a-f-b+c+2=60 to 1000, preferably 90 to 220, particularly preferably 130 to 170. The sum (a+b+c+2) here represents the number of silicon atoms of the organomodified polysiloxane/the chain length of the organomodified polysiloxane.

The siloxane units [$R_2SiO$], [$RR^2SiO$] and [$RR^3SiO$] and also the oxyalkylene groups ($OC_2H_4$), ($OC_3H_6$), ($OC_4H_8$) and ($OC_2H_3Ph$) of the organomodified polysiloxanes of formula (I) can be arranged as desired. They can thus be arranged blockwise with any desired number of blocks and any desired sequence or be statistically distributed; they can also be arranged in an alternating manner, or form a gradient along the chain with respect to their frequency, or have, along the chain, a distribution that results from a possible difference in reactivity of the precursors or that is due to thermodynamic equilibria.

The oxyalkylene groups of the polyether radical $R^2$ are derived from corresponding monomeric alkylene oxides, that is to say ($OC_2H_4$) from ethylene oxide, ($OC_3H_6$) from propylene oxide, ($OC_4H_8$) from butylene oxide and ($OC_2H_3Ph$) from styrene oxide. The polyethers on which the polyether radicals $R^2$ are based may be obtained by addition of the monomeric alkylene oxides onto a starter alcohol, preferably allyl alcohol. The prior art discloses the preparation of such polyethers by alkaline catalysis, for example with potassium or sodium methoxide, or by double metal cyanide catalysis (DMC catalysis) with double metal cyanide catalysts (DMC catalysts). The polyether radical $R^2$ is preferably a hydroxy-functional polyether radical.

The polyoxyalkylene chain of the polyether radical $R^2$ is linked via a divalent radical $Z^1$ to the polysiloxane chain of the organomodified polysiloxane of general formula (I). The divalent radical $Z^1$ is preferably in each case independently selected from the group consisting of divalent alkylene radicals of the formula —$(CH_2)_n$— where n=2 to 10, preferably 3 to 4, particularly preferably 3. $Z^1$ is preferably selected here from divalent ethylene, propylene, 1-methylpropylene and 1,1-dimethylpropylene radicals, especially preferably —$CH_2CH_2CH_2$—.

The polyether radical $R^2$ preferably does not have any groups derived from butylene oxide, that is to say no oxybutylene groups ($OC_4H_8$). Thus, the following preferably applies for the organomodified polysiloxane of general formula (I): f=0. It is also preferred that the polyether radical $R^2$ does not have any groups derived from styrene oxide, that is to say oxyalkylene groups of the formula ($OC_2H_3Ph$). Thus, the following preferably applies for the organomodified polysiloxane of general formula (I): g=0. It is additionally preferred that the polyether radical $R^2$ does not have any oxyalkylene units that are derived from butylene oxide or styrene oxide. It is thus preferred that the following applies for the organomodified polysiloxane of general formula (I): f=0 and g=0. It is further preferred that the polyether radical $R^2$ is additionally derived from allyl alcohol. Thus, further preferably, the following applies: f=0 and g=0 and $Z^1$=—($CH_2$)$_3$—. In addition, it is particularly preferred that the polyether radical $R^2$ is terminated by a hydroxyl group. It is thus particularly preferred that the following applies: f=0 and g=0 and $Z^1$=—($CH_2$)$_3$— and $R^4$=H.

The number-average molecular weight $M_N$ of the polyether radical $R^2$ is preferably from 500 g/mol to 1400 g/mol, more preferably from 600 g/mol to 1200 g/mol, particularly preferably from 700 g/mol to 900 g/mol. The number-average molecular weight $M_N$ of the polyether radical $R^2$ is identical here to the number-average molecular weight $M_N$ of the corresponding monounsaturated polyether on which the polyether radical $R^2$ is based.

It is moreover preferred that the polyether radical $R^2$, calculated without $Z^1$ and calculated without $OR^4$, has a molar mass M(PE) of from 450 g/mol to 1350 g/mol, preferably of from 550 g/mol to 1150 g/mol, particularly preferably of from 650 g/mol to 850 g/mol. The molar mass M(PE) is calculated here according to the equation M(PE)=44 g/mol*d+58 g/mol*e+72 g/mol*f+20120 g/mol*g, where d, e, f and g refer to the indices in formula (II), (IIa) and (IIb), where for formula (IIa) and (IIb) accordingly f=0 and g=0.

It is preferred that the proportion by mass of the oxyethylene groups ($OC_2H_4$), based on the total mass of all oxyalkylene groups, is more than 50%, preferably 60% to 90%, particularly preferably 2570% to 80%.

The proportion by mass of the oxypropylene groups ($OC_3H_6$), based on the total mass of all oxyalkylene groups, is preferably less than 50%, more preferably from 10% to 40%, particularly preferably from 20% to 30%.

It is moreover preferred that the proportion by mass of the oxybutylene groups ($OC_4H_6$), based on the total mass of all oxyalkylene groups, is less than 20%, preferably less than 10%, particularly preferably 0%.

It is moreover preferred that the proportion by mass of the oxyalkylene groups derived from styrene oxide ($OC_2H_3Ph$), based on the total mass of all oxyalkylene groups, is less than 20%, preferably less than 10%, particularly preferably 0%.

With preference, the proportion by mass of the oxyethylene groups ($OC_2H_4$), based on the total mass of all oxyalkylene groups, is at least 50%, preferably 80% to 90%, particularly preferably 70% to 80%, the proportion by mass of the oxypropylene groups ($OC_3H_6$), based on the total mass of all oxyalkylene groups, is at most 50%, preferably 10% to 40%, particularity preferably 20% to 30%, the proportion by mass of the oxybutylene groups ($OC_4H_8$), based on the total mass of all oxyalkylene groups, is 0% and the proportion by mass of the oxyalkylene groups derived from styrene oxide ($OC_2H_3Ph$) is 0%, with the proviso that the sum of the proportion by mass of the oxyethylene groups ($OC_2H_4$) and of the oxypropylene groups ($OC_3H_6$), based on the total mass of all oxyalkylene groups, together make 100%.

Besides the polyether radical $R^2$, the organomodified polysiloxane of formula (I) has an aromatic radical $R^3$. This radical $R^3$ preferably has, as divalent radical $Z^2$, a radical selected from the group consisting of divalent alkylene radicals of the formula —($CH_2$)$_n$— where n=2 to 10, preferably 3 to 4, particularly preferably 3. The radical $R^3$ is preferably selected from a phenol radical or phenol derivative radicals. The radical $R^3$ therefore preferably has exactly one hydroxyl group. Particularly preferred radicals $R^3$ are derived from eugenol or allylphenol, especially from o-allylphenol.

The following applies for a radical $R^3$ derived from eugenol: $Z^2$ is a propylene radical —($CH_2$)$_3$—; three radicals $R^5$ are hydrogen radicals, one radical $R^5$ is a hydroxyl group and one radical $R^5$ is a methoxy group, that is to say: $R^3$=—($CH_2$)$_3$[$C_5H_3$($OCH_3$)]OH.

The following applies for a radical $R^3$ derived from allylphenol: $Z^2$ is a propylene radical —($CH_2$)$_3$—; four radicals $R^5$ are hydrogen radicals and one radical $R^5$ is a hydroxyl group, that is to say: $R^3$=—($CH_2$)$_3$($C_6H_4$)OH.

The organic radicals $R^2$ and $R^3$ may be introduced into the molecule of the polysiloxane by addition of appropriate unsaturated precursors (e.g. allyl or vinyl compounds) onto SIH groups of a corresponding SiH-functional polysiloxane in the presence of a hydrosilylation catalyst, for example according to the method of U.S. Pat. No. 5,334,227 (A) or as described in "*Silicones: chemistry and technology*", *Vulkan-Verlag, Essen*. The organomodified polysiloxanes of formula (I) are therefore preferably prepared by means of hydrosilylation in the manner known to the person skilled in the art. This involves using known methods to react the corresponding hydrosilyl-functional polysiloxanes with olefinically unsaturated compounds. The olefinically unsaturated compounds are olefinically unsaturated polyethers, preferably allyl polyethers, and olefinically unsaturated phenol derivatives, preferably 2-allylphenol and/or eugenol. The hydrosilylation reaction here is preferably catalysed with the aid of the platinum group catalysts familiar to the person skilled in the art, more preferably with the aid of Karstedt catalysts.

The polysiloxane chain of the organomodified polysiloxane of formula (I) has pendent and optionally also terminal (i.e. in α,ω position) radicals selected from the group consisting of $R^2$ and $R^3$. The polysiloxane chain of the organomodified polysiloxane preferably has only pendent radicals selected from the group consisting of $R^2$ and $R^3$. There are, in particular, economic reasons for this.

The degree of branching of the organomodified polysiloxane can be indicated by the quotient (b+c)/(a+b+c+2). Preferably: (b+c)/(a+b+c+2)=0.05 to 0.30, more preferably 0.07 to 0.15, particularly preferably 0.09 to 0.11, Through the choice of the radicals R, $R^1$, $R^2$ and $R^3$ and also the quantitative ratios thereof, it is possible to optimally adjust the defoaming action and cold stability of the defoamer.

The following preferably applies for the organomodified polysiloxane of general formula (I):
R in each case independently is selected from the group consisting of hydrocarbon radicals having 1 to 10 carbon atoms, particularly preferably methyl;

$R^1$ is a radical R, particularly preferably methyl;
$R^2$ in each case independently is selected from the group consisting of polyether radicals of general formula (IIa), $$—Z^1(OC_2H_4)_d(OC_3H_6)_eOR^4 \quad\quad \text{formula (IIa)},$$

particularly preferably of general formula (IIb), $$—(CH_2)_3(OC_2H_4)_d(OC_3H_8)_eOH \quad\quad \text{formula (IIb)};$$

$Z^1$ in each case independently is selected from the group consisting of divalent aliphatic hydrocarbon radicals having 3 to 4, particularly preferably 3, carbon atoms;
$R^4$ in each case independently is selected from the group consisting of a hydrogen radical, a methyl radical and an acetyl radical; particularly preferably is a hydrogen radical;
$Z^2$ in each case independently is selected from the group consisting of divalent aliphatic hydrocarbon radicals having 3 to 4, particularly preferably 3, carbon atoms;
$R^5$ in each case independently is selected from the group consisting of a hydrogen radical, a hydroxy group, alkyl radicals having 1 to 4 carbon atoms and alkoxy radicals having 1 to 4 carbon atoms, with the proviso that at least one radical $R^5$ is a hydroxy group;
a=preferably 80 to 200, particularly preferably 100 to 190;
b=preferably 6 to 25, particularly preferably 8 to 20;
c=preferably 0.8 to 8, particularly preferably 1 to less than 4.5;
d=preferably 5 to 20, particularly preferably 10 to 15;
e=preferably 1 to 30, particularly preferably 2 to 5;
f=preferably 0 to 10, particularly preferably 0;
g=preferably 0 to 10, particularly preferably 0;
with the proviso that:
d+e=5 to 30, particularly preferably 10 to 20; and
a/(b+c)=7 to 13, particularly preferably 8 to 12, especially 9 to 11.

The following applies for particularly preferred organomodified polysiloxanes of general formula (I):
R=methyl;
$R^1$=methyl;
$R^2$=—$(CH_2)_3(OC_2H_4)_d(OC_3H_6)_eOH$;
$R^3$=—$(CH_2)_3(C_8H_4)OH$ or —$(CH_2)_3[C_6H_3(OCH_3)]OH$, especially —$(CH_2)_3(C_6H_4)OH$;
a=100 to 190;
b=8 to 20;
c=1 to less than 4.5;
d=10 to 15;
e=2 to 5;
f=0;
g=0;
with the proviso that:
d+e=10 to 20; and
a/(b+c)=8 to 12, especially 9 to 11.

The inventive organomodified polysiloxanes of formula (I) can be added directly to the fuel as defoamer. However, it is preferred in practice to add the defoamer to the so-called additive package. The additive package essentially contains a detergent, a demulsifier/dehazer and a cetane number improver. In order to improve the compatibility of the organomodified polysiloxane of formula (i) with the additive package, it may be advantageous to use the defoamer in a mixture with 2-ethylhexanol or glycols or aromatic-system-containing solvents.

The invention therefore further relates to a composition comprising the components:
(a) at least one defoamer selected from the group consisting of organomodified polysiloxanes of formula (I);
(b) at least one demulsifier selected from the group consisting of acetylenediols, acetylenediol polyethers, fatty alcohol alkoxylates and polyethersiloxanes that differ from the organomodified polysiloxanes of formula (I);
(c) optionally at least one solvent selected from the group consisting of fatty alcohols having 8 to 11 carbon atoms.

The acetylenediols/acetylenediol polyethers of component (b) are preferably selected from compounds of the general formula R'R"(R"'O)C—C≡C—C(OR"')R"$R^1$;
where R' and R" in each case are independently selected from the group consisting of linear and branched, substituted and unsubstituted alkyl, aryl and alkoxyalkyl radicals having 1 to 10 carbon atoms; and where
R"' in each case independently is selected from the group consisting of a hydrogen atom and polyether radicals.

The polyether radicals are obtainable here by reacting an appropriate alkylenediol R'R"(HO)C—C≡C—C(OH)R"R' with alkylene oxides selected from the group consisting of ethylene oxide, propylene oxide and butylene oxide. R"' is preferably a polyether radical of the formula —$(CH_2CH_2O)_n$—H where n=1 to 60.

The fatty alcohol alkoxylates of component (b) are preparable by alkoxylation, that is reaction with ethylene oxide (fatty alcohol ethoxylates, FAEO), propylene oxide (FAPO) or butylene oxide, but preferably ethoxylation of linear or branched, preferably branched, fatty or oxo alcohols in the presence of basic or acidic catalysts at temperatures of 120-200° C. and pressures of 1-10 bar. The fatty alcohols used here are preferably selected from the group consisting of fatty alcohols having 8 to 16 carbon atoms. These fatty alcohols are preferably saturated alcohols, particularly preferably saturated primary alcohols selected from the group consisting of $C_6H_{13}OH$, $C_7H_{15}OH$, $C_8H_{17}OH$, $C_9H_{19}OH$, $C_{10}H_{21}OH$, $C_{11}H_{23}OH$, $C_{12}H_{25}OH$, $C_{13}H_{27}OH$, $C_{14}H_{29}OH$, $C_{15}H_{31}OH$, $C_{16}H_{33}OH$. The fatty alcohols are adjusted to the desired polarity by the alkoxylation. A suitable measure for the polarity is the HLB value, which is preferably determined by the method of Griffin (W. C. Griffin: Classification of surface active agents by HLB, J. Soc. Cosmet. Chem. 1 1949, pp 311-326). The HLB value of the fatty alcohol alkoxylates is preferably between 5 and 10.

Component (c) is at least one solvent selected from the group consisting of fatty alcohols having 6 to 11 carbon atoms. The fatty alcohols may be linear or branched. They are preferably branched fatty alcohols. It is additionally preferred that the fatty alcohols are saturated alcohols, particularly preferably saturated primary alcohols selected from the group consisting of $C_6H_{13}OH$, $C_7H_{15}OH$, $C_8H_{17}OH$, $C_9H_{19}OH$, $C_{10}H_{21}OH$, $C_{11}H_{23}OH$, for example 2-ethylhexanol or isononanol.

It is preferred here that:
component (a) is present at a proportion by mass of 20% to 80%, preferably of 30% to 70%, particularly preferably of 40% to 60%; and
component (b) is present at a proportion by mass of 1% to 25%, preferably of 2% to 20%, particularly preferably of 4% to 15%;
based on the total mass of the composition according to the invention.

In the composition, components (a) and (b) are preferably present in a ratio by weight of (a) to (b) of from 2:1 to 15:1, preferably of from 3:1 to 13:1, particularly preferably of from 4:1 to 11:1.

This composition comprising the inventive organomodified polysiloxane of formula (I) is added to the fuel as additive package.

The following commercially available products may by way of example be present in the additive package: Surfynol® 420, Surfynol® 440, Surfynol® 2502, TEGO® Antifoam MR 465, TEGO® Antifoam MR 487, TEGO® Antifoam MR 507, TEGO® Antifoam KS 911, TEGO® Surten W 111, TEGO® Surten W 133, TEGO® SOS 25, TEGOPREN® 5801, TEGOPREN® 5803, TEGOPREN®5831, TEGOPREN® 5851, TOM AMINE® PA 14, TOMAMINE® PA 17, TOMAMINE® EC 2, TOMADOL® 25-3, ADOGEN® 570, ADOGEN® 141 D, ADOGEN® 172, VARINE® O, VARONIC® K 202 LC.

Specifically, such additive packages may for example contain:
  cetane number improvers, e.g. 2-ethylhexyl nitrate;
  detergents, e.g. ADOGEN® 570, polyisobutene derivatives;
  corrosion inhibitors, e.g. ADOGEN® 141 D, VARINE® O;
  dehazers and stabilizers, e.g. TOMAMINE® EC 2, TOMADOL® 25-3;
  lubricity improvers, e.g. TOMAMINE® PA 17, fatty acids;
  defoamers, e.g. TEGO® Antifoam 507.

In this connection, the amounts and combination are adapted to the respective requirements. The choice of the raw materials and the adjustment of the quantitative ratios are thus carried out depending on the required property profile.

As an alternative, the inventive organomodified polysiloxane of formula (I) may be added directly to the fuel.

The invention thus further relates to a fuel composition comprising diesel fuel, said diesel fuel preferably comprising biofuel, and at least one organomodified polysiloxane of formula (I) or an inventive composition comprising components (a), (b) and optionally (c).

Diesel fuels are in this case preferably those fuels that satisfy the requirements of DIN EN 590 (October 2017 edition).

The fuel composition according to the invention may either be anhydrous ("dry diesel") or else contain water. In particular, the fuel composition may be a "moist" fuel composition, that is to say a fuel composition having a water content of at least 250 ppm by mass of water based on the fuel composition.

The proportion of organomodified polysiloxanes of formula (I) in the fuel composition is preferably chosen depending on the foaming behaviour of the diesel. The proportion of organomodified polysiloxanes of formula (I) in the fuel composition may therefore vary. It is preferred that the proportion by mass of the at least one organomodified polysiloxane, based on the total mass of the fuel composition, is from 1 ppm to 40 ppm, preferably from 2 ppm to 25 ppm, particularly preferably from 4 ppm to 15 ppm.

In order to achieve a smaller release of $SiO_2$ when the fuel composition is combusted, the proportion of silicon should be set to be as low as possible. It is thus preferred that the proportion by mass of silicon, based on the total mass of the fuel composition, is from 0.2 ppm to 2 ppm, preferably from 0.4 ppm to 1.5 ppm, particularly preferably from 0.5 ppm to 0.8 ppm.

The proportion of biofuel in the fuel composition according to the invention may in principle be any desired proportion. However, it is preferred that the proportion by mass of biofuel, based on the total mass of the fuel composition, is at least 4%, preferably from 4% to 20%, particularly preferably from 4% to 8%. One or more biofuels can be present in the fuel composition according to the invention, if a plurality of biofuels are present in the fuel composition according to the invention, the statements made above regarding the proportion of biofuel relate to the sum total of all biofuels.

The biofuel is preferably selected from the group consisting of fatty acid methyl esters, hydrogenated vegetable oils, hydrocarbons from biomass-to-liquid processes and hydrocarbons from gas-to-liquids processes.

The biofuel is more preferably selected from the group consisting of fatty acid methyl esters, hydrogenated vegetable oils and hydrocarbons from biomass-to-liquid processes.

Particularly preferably, the fuel composition comprises a biofuel based on fatty acid methyl esters (FAME), in particular on rapeseed oil methyl ester as FAME.

The organomodified polysiloxanes of formula (I) are particularly well suited for the defoaming of diesel fuels which comprise biofuels.

The invention thus further relates to the use of an organomodified polysiloxane of formula (I) or an inventive composition comprising components (a), (b) and optionally (c) for the defoaming of liquid fuels, preferably of diesel fuels, particularly preferably of diesel fuels which comprise biofuels.

The present invention is illustrated by way of example in the examples listed below, without any intention that the invention, the scope of application of which is apparent from the entirety of the description and from the embodiments, be restricted to the embodiments mentioned in the examples.

EXAMPLES

Defoamer 1 (Inventive Example)

Defoamer 1 was prepared as follows:

A 500-ml four-neck flask with attached precision glass stirrer, reflux condenser and internal thermometer was initially charged with 117.3 g of a polydimethyl(methylhydrogen)siloxane copolymer, having an average chain length of 155 and having a hydrogen content of 1.12 eq SiH/kg, and 93.7 g of a hydroxy-functional allyl polyoxyalkylene, having an average molecular weight of 832 g/mol (determined according to iodine number), a propylene oxide proportion of 74 wt. % and an ethylene oxide proportion of 26 wt. % (wt. % based on the total mass of propylene oxide and ethylene oxide, EO/PO polyether prepared in accordance with the prior art by means of a KOH-catalysed reaction with allyl alcohol as starter alcohol), together with 7.6 g of 2-allylphenol, and the mixture was heated to 90° C. while stirring. The exothermic reaction was started by addition of 10 ppm of platinum in the form of the Karstedt catalyst (1.5 wt. % of Pt in decamethylcyclopentasiloxane) and after the exothermicity abated the mixture was stirred further at 90° C. The SiH conversion determined by gas volumetric means was 99.5% after 1.5 hours. Addition of 10.8 g of propylene glycol and filtration through a fluted filter afforded a clear, yellow-brownish liquid having a viscosity of 5540 mPa s at 25° C.

Defoamer 2 (Comparative Example)

Defoamer 2 was prepared as follows:

A 500-ml four-neck flask with attached precision glass stirrer, reflux condenser and internal thermometer was initially charged with 90.2 g of a polydimethyl(methylhydrogen)siloxane copolymer, having an average chain length of 155 and having a hydrogen content of 1.12 eq SiH/kg, and 108.16 g of a hydroxy-functional allyl polyoxyalkylene, having an average molecular weight of 832 g/mol (determined according to iodine number), a propylene oxide proportion of 74 wt. % and an ethylene oxide proportion of 26 wt. % (wt. % based on the total mass of propylene oxide and ethylene oxide, EO/PO polyether prepared in accordance with the prior art by means of a KOH-catalysed reaction with allyl alcohol as starter alcohol), and the mixture was heated to 90° C. while stirring. The exothermic reaction was started by addition of 10 ppm of platinum in the form of the Karstedt catalyst (1.5 wt. % of Pt in decamethylcyclopentasiloxane) and after the exothermicity abated the mixture was 35 stirred further at 90° C. The SiH conversion determined by gas volumetric means was 100% after one hour. Addition of 9.8 g of propylene glycol and filtration through a fluted filter afforded a clear, yellow-brownish liquid having a viscosity of 5588 mPa s at 25° C.

Defoamer 2 differs from defoamer 1 in that it has no aromatic radical $R^3$ and instead exclusively polyether radicals $R^2$.

Defoamer 3 (Comparative Example)

Defoamer 3 corresponds to defoamer E1 from DE 10 2007 031 287 A1 and was prepared, in accordance with the preparation instructions disclosed there, as follows:

A 500-ml four-neck flask with attached precision glass stirrer, reflux condenser and internal thermometer was initially charged with 58.6 g of a terminally and pendently SiH-functional polydimethysiloxane, having an average chain length of 155 and having a hydrogen content of 2.40 eq SiH/kg, and 127.2 g of a hydroxy-functional allyl polyoxyalkylene, having an average molecular weight of 1471 g/mol (determined according to iodine number), a propylene oxide proportion of 88 wt. % and an ethylene oxide proportion of 12 wt. % (wt. % based on the total mass of propylene oxide and ethylene oxide, EO/PO polyether prepared in accordance with the prior art by means of a KOH-catalysed reaction with allyl alcohol as starter alcohol), 4.1 g of a hydroxy-functional allyl polyoxyalkylene, having an average molecular weight of 903 g/mol (determined according to iodine number), a butylene oxide proportion of 36 wt. % and an ethylene oxide proportion of 64 wt. % (wt. % based on the total mass of butylene oxide and ethylene oxide, EO/BO polyether prepared in accordance with the prior art by means of a KOH-catalysed reaction with allyl alcohol as starter alcohol), and also 12.2 g of 2-allylphenol, and the mixture was heated to 90° C. while stirring. The exothermic reaction was started by addition of 10 ppm of platinum in the form of the Karstedt catalyst (1.5 wt. % of Pt in decamethylcyclopentasiloxane) and after the exothermicity abated the mixture was stirred further at 90° C. The SIH conversion determined by gas volumetric means was 100% after one hour. Addition of 12 g of propylene glycol and 40.4 g of Solvesso® 150 (solvent based on aromatic hydrocarbons, commercially available from Brenntag) and filtration through a fluted filter afforded a clear, yellow liquid having a viscosity of 834 mPa s at 24° C.

Defoamer 4 (Comparative Example)

Defoamer 4 is commercially available under the name TEGOPREN® 5851 (TP 5851) from Evonik industries AG. It is a polyether-modified polysiloxane that does not have any aromatic groups $R^3$.

Performance Test Methods:

Defoaming Capacity:

For the testing of the defoaming capacity of the defoamers, the latter are dissolved in an additive package according to the prior art. The additive package with defoamer is used in the diesel as specified at 320 ppm by mass (calculated as additive package without defoamer). This involves adding defoamer to the additive package in an amount such that the Si content reported in Table 2 is obtained.

The composition of the additive package without defoamer can be found in Table 1:

TABLE 1

| Function | Raw material | Proportion by mass in the additive package |
|---|---|---|
| Corrosion inhibitor | C13 fatty alcohol 24-propoxylate | 21% |
| Lubricity improver | PiB-phenol-formaldehyde-amine | 21% |
| Cetane number improver | isoamyl nitrate | 30% |
| Demulsifier/dehazer | alkoxylated acetylenediol | 2% |
| Solvent | ethylhexyl alcohol | 26% |

The foam disintegration of the diesel fuel admixed with additive package and defoamer is tested in a pressure apparatus (BNPé test: Liquid petroleum products—Determination of the foaming tendency of diesel fuels NFM 07-075:1997). This test is conducted as follows: 100 ccm of diesel fuel are filled into a glass tube and subjected to a pressure of 0.4 bar. The glass tube is connected via a solenoid valve at the base to a 250-ccm measuring cylinder. The diesel is injected into the measuring cylinder via the valve. After injection, the initial foam height [ml] and the time [s] until the foam has disintegrated are determined. At least double determinations are conducted. If the results of the disintegration time are more than 4 s apart and those of the foam height measurement are more than 10 ml apart, a further measurement has to be conducted. The foam height is given by the difference between the maximum foam height and the height of the liquid. The foam disintegration time indicates the duration of time required until the surface of the liquid is visible for the first time. The values reported in Table 2 are averages. The defoaming tests are conducted using B0 diesel and B10 diesel. B10 diesel is understood here to be a diesel fuel composed of 90 wt. % fossil diesel as per DIN EN 590 (October 2017 edition) and 10 wt. % rapeseed oil methyl ester (biofuel addition). B0 diesel is understood in turn to be a diesel fuel composed of 100 wt. % fossil diesel as per DIN EN 590 (October 2017 edition) without biofuel addition. The investigated diesel fuels B0 diesel and B10 diesel are also moist diesel fuels having a content of 250 ppm by mass of water.

Surface Tension:

The surface tension is determined as per standard ISO 19403-3:2017. Since the defoamers are not water soluble, a solvent/water mixture is chosen to this end that both dissolves the defoamer and also has a surface tension which corresponds to that of a diesel fuel admixed with biodiesel. The solvent/water mixture consists of 45 wt. % butyl glycol and 55 wt. % water and displays a surface tension of approximately 27.4 mN/m. For the determination of the surface tension, 1 g of the defoamer is dissolved in 1 l of the solvent/water mixture. The surface tensions thus determined are listed in Table 2, in order to achieve a defoaming effect, it is necessary for the surface tension of the solvent/water mixture with defoamer to be lower than that of the solvent/water mixture without defoamer.

Pour Point

The pour point of the pure defoamer is a measure of the cold stability and is determined as per DIN ISO 3016:2017-11.

Performance Test Results:

The results of the performance tests are summarized in Table 2.

TABLE 2

|  | Defoamer | | | | |
| --- | --- | --- | --- | --- | --- |
|  | 1 | 2 | 3 | 4 | Blank [1] |
| Surface tension [mN/m] | 22.6 | 23.8 | 26.5 | 26.3 | 27.4 |
| Pour point [° C.] | <−25 | −5 | <−25 | −18 | −3 |
| Si content in the OMS [wt. %] [2] | 15 | 15 | 9 | 12 | — |
| OMS content of the fuel composition [ppm by weight] [3] | 4 | 4 | 12 | 12 | 0 |
| Si content of the fuel composition [ppm by weight] [4] | 0.6 | 0.6 | 1.0 | 1.4 | 0 |
| Foam height B0 [ml] | 29 | 35 | 45 | 60 | 132 |
| Foam disintegration time B0 [s] | 1 | 1 | 1 | 1 | 38 |
| Foam height B10 [ml] | 59 | 62 | 60 | 103 | 135 |
| Foam disintegration time B10 [s] | 1 | 1 | 1 | 9 | 42 |

[1] Blank refers to a corresponding composition without defoamer
[2] Silicon content of the organomodified polysiloxane in wt. % (mass %, proportion by mass of silicon in the organomodified siloxane)
[3] Concentration of the organomodified polysiloxane in the fuel composition consisting of B10/B0 diesel and additive package with/without defoamer in ppm by weight (ppm by mass, proportion by mass of the organomodified polysiloxane based on the total composition)
[4] Silicon content of the fuel composition consisting of B10/B0 diesel and additive package with/without defoamer in ppm by weight (ppm by mass, proportion by mass of silicon based on the total composition)

The inventive defoamer 1, already at a very low use concentration, leads to a sufficiently low surface tension, short foam disintegration times, low foam heights and a low pour point, and is better than non-inventive defoamers 2 to 4 in terms of at least one of these properties.

Moreover, on account of the improved efficacy of defoamer 1, smaller use amounts are needed. This leads to a smaller release of $SiO_2$ during combustion. Long-term diesel filters must therefore take up considerably less material. Loading by $SiO_2$ particles is reduced.

It is especially apparent that, for a foam disintegration time of fewer than 5 seconds and a reduction in foam height to less than 50% of the blank, defoamers are required in an amount of 0.6 ppm by weight of Si, based on fuel composition, instead of the hitherto customary amounts of 0.75 to 1 ppm by weight as are mentioned in the prior art. This signifies a 25 to 70% reduction in the $SiO_2$ load for the diesel filter.

The invention claimed is:

1. An organomodified polysiloxane of formula (I),

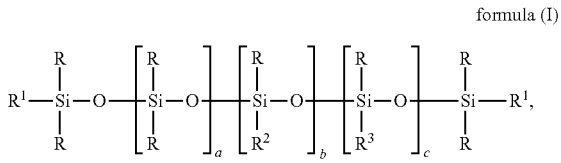

formula (I)

in which
R in each case independently is selected from the group consisting of hydrocarbon radicals;
$R^1$ in each case independently is selected from the group consisting of R, $R^2$ and $R^3$;
$R^2$ in each case independently is selected from the group consisting of polyether radicals of formula (II),

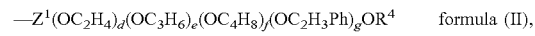

$Z^1$ in each case independently is selected from the group consisting of divalent aliphatic hydrocarbon radicals having 2 to 10 carbon atoms;
Ph is a phenyl radical;
$R^4$ in each case independently is selected from the group consisting of a hydrogen radical, alkyl radicals having 1 to 4 carbon atoms and acyl radicals having 1 to 4 carbon atoms;
$R^3$ in each case independently is selected from the group consisting of radicals of formula (III),

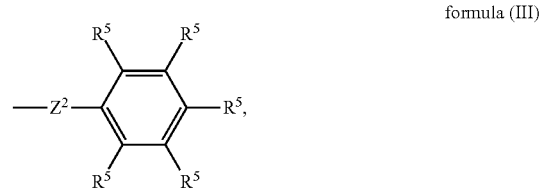

formula (III)

$Z^2$ in each case independently is selected from the group consisting of divalent aliphatic hydrocarbon radicals having 2 to 10 carbon atoms;
$R^5$ in each case independently is selected from the group consisting of a hydrogen radical, a hydroxy group, alkyl radicals having 1 to 4 carbon atoms, and alkoxy radicals having 1 to 4 carbon atoms, with the proviso that at least one radical $R^5$ is a hydroxy group;
wherein:
a=50 to 960;
b=4 to 85;
c=0.5 to 10;
d=0 to 60;
e=0 to 60;
f=0;
g=0 to 60;
with the proviso that:
d+e+f+g=1 to 60; and
a/(b+c) is greater than 7.

2. The organomodified polysiloxane according to claim 1, wherein
a+b+c+2=60 to 1000.

3. The organomodified polysiloxane according to claim 1, wherein
g=0.

4. The organomodified polysiloxane according to claim 1, wherein a number-average molecular weight $M_N$ of the polyether radical $R^2$ is from 500 g/mol to 1400 g/mol.

5. The organomodified polysiloxane according to claim 1, wherein a proportion by mass of the oxyethylene groups ($OC_2H_4$), based on a total mass of all oxyalkylene groups, is more than 50%.

6. A composition, comprising:
(a) at least one defoamer selected from the group consisting of organomodified polysiloxanes of formula (I) according to claim 1;
(b) at least one demulsifier selected from the group consisting of acetylenediols, acetylenediol polyethers, fatty alcohol alkoxylates, and organomodified polysiloxanes that differ from the organomodified polysiloxanes of formula (I);
(c) optionally at least one solvent selected from the group consisting of fatty alcohols having 6 to 11 carbon atoms.

7. The composition according to claim 6, wherein
component (a) is present at a proportion by mass of 20% to 80%; and
component (b) is present at a proportion by mass of 1% to 25%;
based on the total mass of the composition.

8. The composition according to claim 6, wherein components (a) and (b) are present in a ratio by weight of (a) to (b) of from 2:1 to 15:1.

9. A fuel composition, comprising:
diesel fuel, and
at least one organomodified polysiloxane according to claim 1.

10. The fuel composition according to claim 9, wherein a proportion by mass of the at least one organomodified polysiloxane, based on a total mass of the fuel composition, is from 1 ppm to 40 ppm.

11. The fuel composition according to claim 9, wherein a proportion by mass of silicon, based on a total mass of the fuel composition, is from 0.2 ppm to 2 ppm.

12. The fuel composition according to claim 9, wherein the diesel fuel comprises biofuel, and wherein a proportion by mass of biofuel, based on a total mass of the fuel composition, is at least 4%.

13. The fuel composition according to claim 9, wherein the diesel fuel comprises biofuel, and wherein the biofuel is selected from the group consisting of fatty acid methyl esters, hydrogenated vegetable oils, hydrocarbons from biomass-to-liquid processes, and hydrocarbons from gas-to-liquids processes.

14. A method of reducing foam formation in a fuel, comprising:
adding the organomodified polysiloxane according to claim 1 to a fuel.

15. The organomodified polysiloxane according to claim 1, wherein the hydrocarbon radicals of R have 1 to 10 carbon atoms.

16. The organomodified polysiloxane according to claim 1, wherein R and/or $R^1$ in each case is methyl.

17. The organomodified polysiloxane according to claim 1, wherein $R^2$ in each case independently is formula (IIa), $$-Z^1(OC_2H_4)_d(OC_3H_6)_eOR^4 \qquad \text{formula (IIa)},$$

or formula (IIb), $$-(CH_2)_3(OC_2H_4)_d(OC_3H_6)_eOH \qquad \text{formula (IIb)}.$$

18. The organomodified polysiloxane according to claim 1, wherein divalent aliphatic hydrocarbon radicals $Z^1$ in each case independently has 3 to 4 carbon atoms.

19. The organomodified polysiloxane according to claim 1, wherein $R^4$ in each case independently is selected from the group consisting of a hydrogen radical, a methyl radical and an acetyl radical.

20. The organomodified polysiloxane according to claim 1, wherein the divalent aliphatic hydrocarbon radicals of $Z^2$ in each case independently have 3 to 4 carbon atoms.

21. The organomodified polysiloxane according to claim 1, wherein
a=100 to 190;
b=8 to 20;
c=0.8 to 8;
d=5 to 20;
e=1 to 30;
f=0; and
g=0 to 10;
with the proviso that:
d+e+f+g=5 to 30; and
a/(b+c) is from 7 to 13.

22. The organomodified polysiloxane according to claim 2, wherein a+b+c+2=90 to 220.

23. The organomodified polysiloxane according to claim 3, wherein $Z^1$=—$(CH_2)_3$— and optionally, $R^4$=H.

24. The organomodified polysiloxane according to claim 4, wherein the number-average molecular weight $M_N$ of the polyether radical $R^2$ is from 600 g/mol to 1200 g/mol.

25. The organomodified polysiloxane according to claim 5, wherein the proportion by mass of the oxyethylene groups ($OC_2H_4$), based on the total mass of all oxyalkylene groups, is 60% to 90%.

26. The composition according to claim 7, wherein
the proportion by mass of component (a) is 30% to 70% and the proportion by mass of component (b) is 2% to 20%; based on the total mass of the composition.

27. The composition according to claim 8, wherein
the ratio by weight of (a) to (b) is from 3:1 to 13:1.

28. A fuel composition, comprising:
diesel fuel, and
at least one composition according to claim 6.

29. The fuel composition according to claim 10, wherein
the proportion by mass of the at least one organomodified polysiloxane, based on the total mass of the fuel composition, is from 2 ppm to 25 ppm.

30. The fuel composition according to claim 11, wherein
the proportion by mass of silicon, based on the total mass of the fuel composition, is from 0.4 ppm to 1.5 ppm.

31. The fuel composition according to claim 12, wherein
the proportion by mass of biofuel, based on the total mass of the fuel composition, is from 4% to 20%.

* * * * *